UNITED STATES PATENT OFFICE.

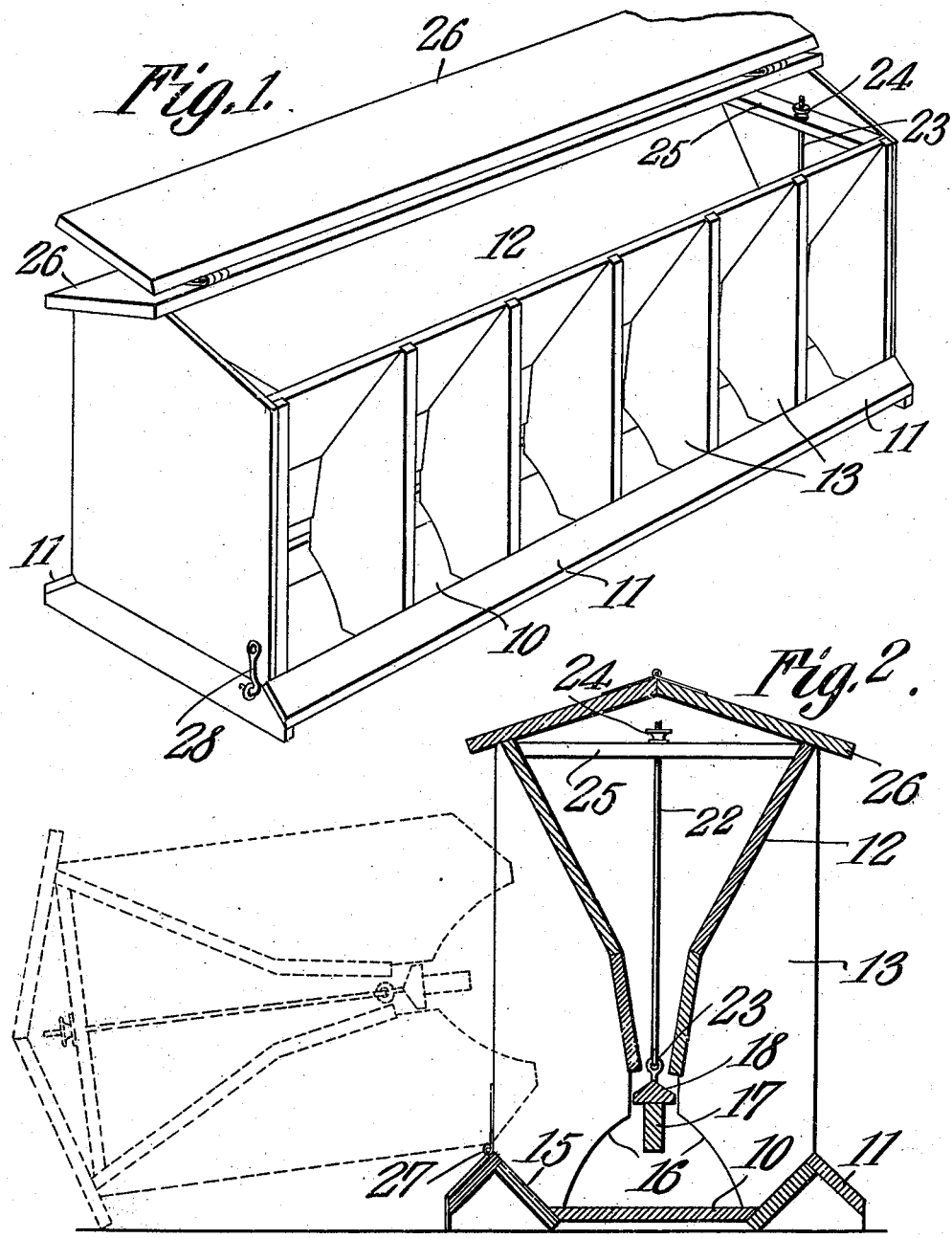

CANBY A. WRIGHT, OF ROSENDALE, MISSOURI, ASSIGNOR TO WRIGHT'S STOCK FEEDER CO., INC., OF VIRDEN, ILLINOIS.

STOCK-FEEDER.

No. 920,806.   Specification of Letters Patent.   Patented May 4, 1909.

Application filed March 6, 1908. Serial No. 419,593.

*To all whom it may concern:*

Be it known that I, CANBY A. WRIGHT, a citizen of the United States, residing at Rosendale, in the county of Andrew and State of Missouri, have invented a new and useful Stock-Feeder, of which the following is a specification.

This invention relates to stock feeders, and more especially to those adapted to feed a number of head of stock at one and the same time, and yet keep the feed for each animal separate.

One object of the invention is to simplify and improve a structure of this character and produce an easily operated device which may be adapted to various sizes of animals.

Another object of my invention is to provide a feeder in which the animals will be kept from seeing each other in the act of eating.

The invention consists in general of a trough provided with a hopper and chute leading thereto, and a number of stalls peculiarly arranged in reference to said hopper, chute and trough.

The invention further consists in certain novel features of construction and arrangement of parts, hereinafter fully described, illustrated in the accompanying drawings, and specifically claimed.

In the accompanying drawings:—Figure 1 is a perspective view of the trough embodying my invention, and Fig. 2 is a vertical transverse sectional view therethrough.

Similar numerals of reference are employed to indicate corresponding parts throughout the several figures of the drawings.

The numeral 10 indicates a trough member preferably arranged with an outwardly slanting extension to the sides, as shown at 11. Above this trough is carried a hopper 12 extending longitudinally of the trough, as clearly shown in Fig. 2. Division plates or partitions 13 are attached to the hopper 12, extending laterally from each side thereof, making a stall for each animal, and these partitions are preferably rabbeted into the hopper and chute and braced, as indicated at 14. The bottom of these partitions is shaped to conform to the inside of the trough, as shown clearly at 15, and that portion of said partitions lying adjacent the center of the chute is cut away, as indicated at 16, to form a passage longitudinally of the trough. Below the mouth of the chute extends a bar 17, this bar running the entire length of the trough. The bar 17 is provided with a T-head having anti-clinal surfaces, as shown at 18. The adjustment for this bar is shown plainly in Fig. 2, and comprises a rod 22 loosely connected to said bar, as at 23, the rod 22 being threaded at the upper end and provided with a thumb screw or the like 24. Braces 25 extend across the hopper and through these braces passes the rod 22, the thumb screw 24 being on the upper side thereof to support the bar 17 at any desired height. The hopper is normally closed by a hinged top indicated by the numeral 26. On one edge of the trough there are provided hinges 27 to which are secured the hopper, chute and partitions, so as to permit the same to be folded back, as indicated by the dotted lines in Fig. 2, and thus allow the trough to be thoroughly cleaned.

Latches 28 are provided on the opposite side of the trough to hold the hopper in fixed relation thereto when desired. It will be observed that the partitions 13 which constitute the stalls wherein the separate animals are to be fed, extend to the bottom of the trough, and it will be noted that the effect of this is that the animals cannot see each other as they are feeding, and that, therefore, they will eat more quietly than where each one is hurrying to get his full share. It will, also, be noted that by extending the divisions to the bottom of the trough member when the animals are cleaning the last of the food from the trough, their pressure against the divisions will be less apt to break them than where they are raised above the bottom of the trough and the animal can get his nose beneath the division. The division bar being hung in this manner is in reach of the animals nose, and if the feed does not discharge as fast as it is eaten out, the nosing of the animal in the stall swings the bar and releases the feed. It will further be observed that either form of bar may be used with either form of feeder, or the bar may be removed entirely, if desired.

It is obvious that many minor changes may be made in the form and construction of the device without departing from the principles of the same, and it is not therefore desired to limit the same to the exact form herein shown and described, but to include all such as properly come within the scope of the invention.

What is claimed is:—

In a stock feeder, a trough, a feed hopper disposed there-above and having a chute depending therefrom, cross-pieces arranged within the hopper adjacent each end thereof, a rod engaged at its upper end through each of the cross-pieces and rigid with respect thereto, the upper end of each rod being threaded, an adjusting nut engaged upon the said threaded end of each rod and bearing against the upper side of the corresponding cross-piece, the rods extending downwardly into the chute and terminating at their lower ends in eyes located in a plane with the lower end of the chute, and a division plate, T-shaped in cross section, suspended from the lower ends of the rods, the head of the T being formed with anticlinal surfaces and being provided with eyes which engage with the eyes at the lower ends of the rods and serve to support the division plate from the said lower ends of the rods for free swinging movement, the plate being located entirely beneath the discharge end of the hopper, and the point of pivotal connection of the plate with the lower ends of the rods being located in a plane with the said end of the hopper.

In testimony that I claim the foregoing as my own, I have hereto affixed my signature in the presence of two witnesses.

CANBY A. WRIGHT.

Witnesses:
 A. A. HOPKINS,
 J. G. COFFMAN.